Oct. 27, 1959     P. O. SLETTEN     2,910,182
WATER CLARIFYING UNIT
Filed April 29, 1957     2 Sheets-Sheet 1
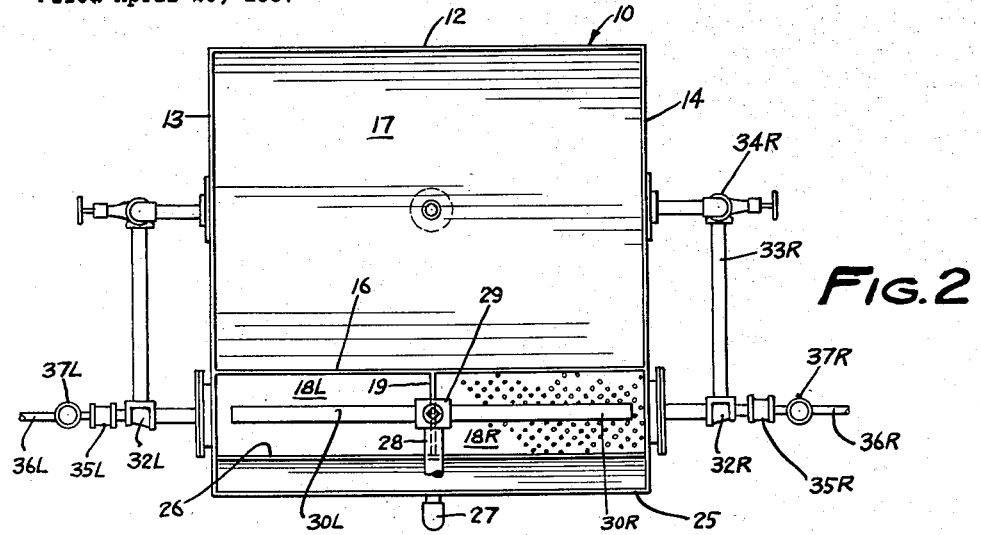
FIG. 2
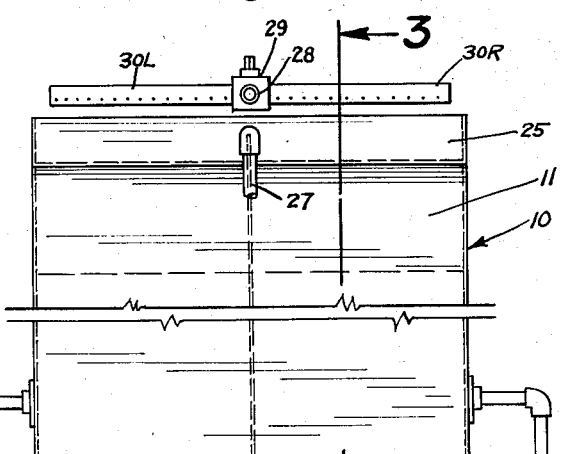
FIG. 1
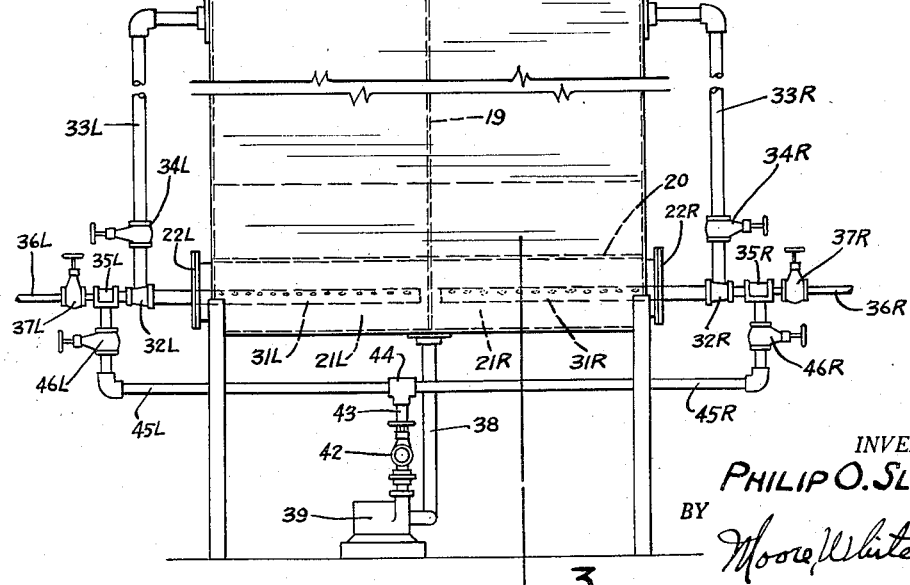
INVENTOR.
PHILIP O. SLETTEN
BY
Moore, White & Burd
ATTORNEYS United States Patent Office 2,910,182
Patented Oct. 27, 1959

2,910,182
WATER CLARIFYING UNIT

Philip O. Sletten, Winthrop, Minn., assignor to Tri County Dairy Cooperative, Winthrop, Minn., a cooperative of Minnesota Application April 29, 1957, Serial No. 655,617

5 Claims. (Cl. 210—264)

This invention relates to a device for clarifying water, or more particularly to a device for treating water from milk evaporators to render the water suitable for use as boiler feed water in high pressure boilers.

The drying of milk is a well established and growing industry and many milk drying plants exist in the dairylands of this country. The evaporators used in milk drying plants require high pressure steam. Because of the natural high mineral content of water in most sections of the country it is necessary that the water be especially treated to demineralize or soften it before the water is introduced into the boiler. In most instances an ion exchange water softening process is used to treat the boiler feed water. For a moderate to large milk drying plant the cost of treating boiler feed water may cost from several hundred to several thousand dollars a year.

One by-product of the milk evaporation process is condensed water vapor which is soft and pure except for contamination by a small amount of entrained milk solids. The presence of milk solids in the water, of course, renders it unsuitable for use in boilers. It has been discovered that the water from milk evaporators may be treated to render it suitable for use in high pressure boilers, thereby eliminating the high cost of demineralizing water for boiler feed.

The principal object of this invention, therefore, is to provide a filtering and clarifying unit by which condensed water vapor from milk evaporators is treated to render it suitable for use as boiler feed.

Another object of this invention is to provide a water treating device having a double clarifying section whereby one clarifying section may be used to treat water from milk evaporators and the other clarifying section may simultaneously be backwashed, thereby insuring continuous efficient operation and treatment.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is a front elevation of the water clarifying unit of this invention;

Figure 2 is a top plan view of the water clarifier; and

Figure 3:
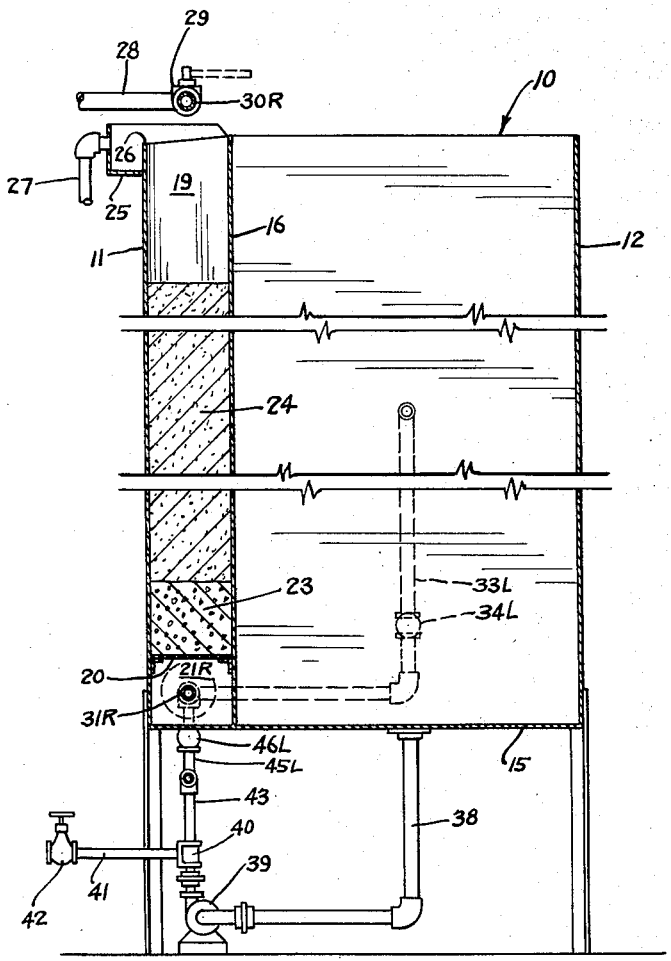
Figure 3 is an end elevation, in section, taken on the line 3—3 of Figure 1 and in the direction of the arrows.

Referring to the drawings, the water clarifying unit of this invention comprises a relatively deep generally rectangular tank, indicated generally at 10, and including a front wall 11, a back wall 12, end walls 13 and 14 and a bottom 15. The tank is suitably supported, as by legs, as shown. The tank 10 is divided by a full length vertical wall 16 into a relatively large storage chamber 17 and a relatively smaller treating chamber 18. The dividing wall 16 is spaced from and generally parallel to the front wall 11 of the tank.

The treating chamber 18 is in turn divided into two approximately equal columns 18L and 18R by another full length vertical wall 19. The dividing wall 19 extends between and is generally normal to front wall 11 and dividing wall 16 and down to the bottom wall 15. The wall 19 is generally parallel to end walls 13 and 14 and is positioned approximately equidistant from them. A perforated plate or screen 20 is positioned in the bottoms of the treating columns 18L and 18R spaced from the bottom wall 15 of the tank. The foraminous plate 20 extends between the front wall 11 and dividing wall 16, between the end walls 13 and 14 and dividing wall 19. The foraminous plate is generally parallel to the bottom wall 15 to define two receiving chambers 21L and 21R, respectively, at the bottom of the treating columns. The outside ends of the receiving chambers 21L and 21R are provided with flanged openings which are covered respectively by cover plates 22L and 22R.

The treating columns 18L and 18R are filled for a substantial portion of their depth with a filtering and clarifying medium supported on the perforated plate 20. Preferably the bottoms of the treating columns are filled with a bed of coarse sand or gravel 23 above which is disposed a deeper bed of fine sand or similar treating medium. A preferred clarifying material is a granular porous carbon processed to absorb emulsified oil from condensate without the addition of a coagulant feed and pH control. One such material is available under the trademark "Oilex."

An overflow trough 25 is provided around the top portion of the treating columns 18L and 18R to receive any overflow from those columns. The trough 25 extends slightly higher than the top edges of walls 11, 13 and 14. The top edge of the front wall 11 forms a weir 26 for regulating overflow when the storage tank is full, as explained in greater detail hereinafter. An overflow pipe 27 communicates with the trough 25 and the sewer. The overflow pipe 27 intersects the trough wall above the bottom of the trough to permit settling of any sediment which might be contained in either the water from the evaporators or the backwash water.

A supply pipe 28 terminates in a three-way plug valve 29 above the top of the treating chamber 18. Perforated distributor pipes or tubes 30L and 30R communicate with the supply pipe through the three-way valve 29. Distributor pipe 30L is disposed above the treating column 18L and distributor pipe 30R is positioned above treating column 18R. Depending upon the position of the plug in the three-way valve 29, supply water from the milk evaporators is introduced through one of the distributor tubes into column 18L or 18R, but not to both.

A pair of receiving pipes 31L and 31R is disposed in the receiving chambers 21L and 21R, respectively, to receive the treated water from the treating chambers 18L and 18R, respectively. The ends of the receiving pipes 31L and 31R extend out through the cover plates 22L and 22R, respectively, to reducing T's 32L and 32R, respectively. From T 32L a pipe 33L extends backwardly and upwardly and through end wall 13 to communicate with the storage chamber of the tank about halfway up the side of the tank. Pipe 33L is provided with a valve 34L by which the line is opened or closed. Similarly, a pipe 33R extends backwardly and upwardly from reducing T 32R to intersect the end wall 14 of the tank and communicate with the storage chamber therein. Line 33R is likewise provided with a valve 34R.

The third port of T 32L communicates directly with a T 35L, one port of which communicates with a steam pipe 36L which is provided with a valve 37L. The identical structure is provided on the right side of the unit as indicated in the drawings.

An outlet or discharge pipe 38 intersects the bottom wall 15 of the tank 10 to communicate with the storage chamber 17. The opposite end of pipe 38 extends to a pump 39. The opposite side of pump 39 communicates with a T 40. One port of T 40 communicates with a boiler feed pipe 41. Pipe 41 is provided with a valve 42.

The remaining port of T 40 communicates through a short length of pipe 43 with another T 44. One port of T 44 communicates through a pipe 45L with T 35L. Pipe 45L is provided with a valve 46L. Similarly, the remaining port of T 44 is connected through pipe 45R with T 35R and pipe 45R is provided with a valve 46R.

As an example of the normal operation of the clarifying device of this invention, condensed water vapor from a milk evaporator is introduced through supply pipe 28. The control plug of the three-way valve 29 is turned so as to divert all of the supply water into distributor pipe 30L. Thus, it will be seen that only treating column 18L will be utilized. The water from distributor pipe 30L is introduced into treating column 18L where it slowly passes through the clarifying beds 24 and 25 and through the perforated plate 20 into the receiving chamber 21L. During this time valve 34L is open and valves 37L and 46L are closed.

As treated water accumulates in receiving chamber 21L it is forced by the hydrostatic pressure imposed by the column 18L to flow into the perforated receiving pipe 31L. Because the valves 37L and 46L are closed the treated water can only flow through line 33L and valve 34L up and into the storage chamber 17 of the tank 10. The treated water is introduced into the storage chamber at a point somewhat above the bottom wall in order to minimize turbulation which might be caused by the incoming stream.

To feed the treated water from the storage chamber 17 to the boiler, valves 46L and 46R are kept closed and valve 42 is opened. Thus, when pump 39 is turned on water is pumped through the outlet pipe 38, through the pump 39, and out through line 41 and valve 42 to the boiler feed tank (not shown).

It will be understood that at the time the treating column 18L is being employed to clarify the water from the milk evaporators valve 34R must necessarily be kept closed if outflow through pipe 33R is to be avoided. Valves 37L and 37R each control a source of steam under pressure and thus are kept closed except when steam pressure is being used to assist backwashing of the treating chambers.

When, in the judgment of the operator, the clarifying efficiency of the treating column 18L is being impaired by accumulation of entrained milk solids, and possibly other contaminants, he turns the plug of the three-way valve 29 to divert all of the feed from the supply pipe 28 into distributor pipe 30R in order to utilize the treating column 18R. Treatment in this column then proceeds as previously described for treating column 18L.

Simultaneously with the treatment of the evaporator water in column 18R the other column 18L may be cleaned and backwashed to put it in readiness for reuse. In order to accomplish backwashing of column 18L valve 34L is closed, valve 46R and valve 42 are closed, and valve 46L is opened. When pump 39 is turned on water flows through pipe 38 from the storage chamber 17 through the pump up through pipe 43 and line 45L through the valve 46L and into the perforated receiving pipe 31L. The backwash water is then forced up and through the perforated plate 20, the coarse clarifying bed 23 and the fine clarifying bed 22 and overflows over the left side of weir 26 into the overflow trough 25 from where it is discharged to the sewer through the overflow pipe 27.

The backwashing cycle is preferably assisted by the use of steam pressure by opening valve 37L and admitting steam from the line 36L. In the backwash cycle entrained milk solids and any other contaminants accumulated in the clarifying beds are dislodged and carried upwardly with the rising stream of backwash water and discharged to the sewer. Upon completion of the backwash cycle the revitalized treating column 18L is held in readiness for reuse at such time as the efficiency of the other treating column 18R becomes impaired due to the accumulation of contaminants in the clarifying bed.

If at any time while water from the milk evaporators is being clarified and the storage chamber 17 becomes completely filled with treated water, the hydrostatic head created by the water in the storage chamber equals that in the treating chamber so that further treatment ceases. The continued supply simply overflows over weir 26 into the overflow trough 25 and through the overflow pipe 27 to the sewer until such time as water is withdrawn from the storage chamber 17 either for boiler feed water or for backwashing purposes and the hydrostatic pressure in the treating column exceeds that in the storage chamber.

It will be seen that any sediment which escapes through the clarifying bed and through the perforated plate 20 will accumulate in the bottom of the receiving chambers 21L and 21R from where it can be removed by removing the cover plates 22L and 22R. It will be clear that when column 18L is put back in service column 18R may then be backwashed in the same manner as previously described for the lefthand column.

It will be understood that the sizes and dimensions of the clarifying unit and its various components may be varied widely depending upon particular clarifying requirements. In one exemplary installation an eight foot deep bed of granulated porous carbon was disposed over a one foot deep bed of coarse gravel in a clarifying unit whose tank had an over-all height of twelve feet with good results.

Although the preferred embodiment of the invention includes dual treating columns and accessory elements it will be apparent that where continuous operation is not required a unit with a single treating column may be used. In this instance clarification necessarily must be suspended while backwashing takes place. Alternatively, two units each having a single treating column may be used in series.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A water clarifying device for treating condensed water vapor from milk evaporators for reuse as boiler feed water, said clarifying unit comprising a generally rectangular deep tank open to atmospheric pressure, a vertical wall within said tank dividing said tank into a storage chamber and a treating chamber, a vertical wall in said treating chamber dividing said chamber into two treating columns, a foraminous horizontal wall member in said treating chamber spaced from the bottom wall of said tank to support a filtering material in said treating columns for flow of water therethrough by gravity and define a receiving chamber at the bottom of each of said treating columns, a water receiving pipe extending through said tank wall into each of said receiving chambers, pipe means connecting the ends of said receiving pipes with said storage chamber, a valve in said connecting pipe means, a discharge pipe connecting the bottom of said storage chamber with a pump, pipe means connecting said pump with the ends of each of said water receiving pipes, a valve in each of said last mentioned pipe means, a discharge outlet between said pump and the valve in the pipe means connecting the pump and said water receiving pipes, and supply means for introducing water to the top of said treating columns.

2. A water clarifying unit according to claim 1 further characterized in that an overflow trough is provided adjacent to the top of said water treating columns to receive overflow therefrom.

3. A water clarifying unit according to claim 1 further characterized in that said supply means includes a supply pipe, an elongated perforated distributor pipe extending above said treating columns, and a three-way valve connecting said supply pipe and said distributor pipe intermediate of the ends of said distributor pipe whereby supply water may be diverted to one or the other of said treating columns.

4. A water clarifying unit according to claim 1 further characterized in that said pipe means connecting the water receiving pipes in the receiving chambers with the storage tank enter the storage tank spaced upward from the bottom thereof.

5. A water clarifying unit according to claim 1 further characterized in that each of said water receiving pipes is connected to a valved steam inlet pipe.

References Cited in the file of this patent

UNITED STATES PATENTS

| | | |
|---|---|---|
| 260,714 | Strunz | July 4, 1882 |
| 838,052 | Pfautz | Dec. 11, 1906 |
| 2,046,265 | Hewetson | June 30, 1936 |
| 2,315,223 | Riche | Mar. 30, 1943 |
| 2,407,228 | Forsyth | Sept. 10, 1946 |
| 2,472,309 | Opsahl | June 7, 1949 |